(12) United States Patent
Howell

(10) Patent No.: US 6,374,849 B1
(45) Date of Patent: Apr. 23, 2002

(54) TEST COCK APPARATUS WITH FREEZE PROTECTION CAPABILITY

(75) Inventor: Julie Howell, Charlotte, NC (US)

(73) Assignee: Conbraco Industries, Inc., Matthews, NC (US)

( * ) Notice: Subject to any disclaimer, the term of this patent is extended or adjusted under 35 U.S.C. 154(b) by 0 days.

(21) Appl. No.: 09/676,232

(22) Filed: Sep. 29, 2000

(51) Int. Cl.⁷ .............................. F16K 31/64; E03C 1/10
(52) U.S. Cl. .......................... 137/62; 137/218; 137/557
(58) Field of Search ........................... 137/62, 218, 557

(56) References Cited

U.S. PATENT DOCUMENTS

| | | | |
|---|---|---|---|
| 4,066,090 A | 1/1978 | Nakajima et al. | |
| 4,081,971 A | 4/1978 | Eber | |
| 4,117,856 A | 10/1978 | Carlson et al. | |
| 4,153,040 A | 5/1979 | Harrison et al. | |
| 4,296,770 A | 10/1981 | Rice | |
| 4,356,833 A | * 11/1982 | Mayfield et al. ............... | 137/62 |
| 4,456,024 A | 6/1984 | Roberts | |
| 4,460,006 A | 7/1984 | Kolze | |
| 4,460,007 A | 7/1984 | Pirkle | |
| 4,541,448 A | 9/1985 | Kolze | |
| 4,638,828 A | 1/1987 | Barrineau, Sr. et al. | |
| 4,848,389 A | 7/1989 | Pirkle | |
| 4,878,512 A | 11/1989 | Pirkel | |
| 4,883,082 A | 11/1989 | Pirkle | |
| 4,930,492 A | 6/1990 | Rich | |
| 5,220,937 A | 6/1993 | Roberts et al. | |
| 5,551,473 A | * 9/1996 | Lin et al. ...................... | 137/218 |
| 5,566,704 A | 10/1996 | Ackroyd et al. | |
| 5,628,285 A | 5/1997 | Logan et al. | |
| 5,711,341 A | * 1/1998 | Funderburk et al. ..... | 137/557 X |
| 5,715,855 A | 2/1998 | Bennett | |

OTHER PUBLICATIONS

Therm–Omega–Tech publication; "Freeze Protection Valve—Heat Actuate Trap–Ambient Discharge"; Published prior to Sep. 29, 2000.

* cited by examiner

*Primary Examiner*—Gerald A. Michalsky
(74) *Attorney, Agent, or Firm*—Adams, Schwartz & Evans, P.A.

(57) ABSTRACT

A test cock apparatus with freeze protection capability for controlling fluid pressure and flow in a backflow preventer valve, including a valve housing having interior walls defining a chamber therein and including an inlet port and a discharge port communicating with said chamber for permitting fluid flow therethrough. A temperature-responsive freeze protection element is positioned within the chamber and is axially moveable between a closed position in sealing engagement with the interior walls of the valve housing for preventing fluid flow through said discharge port, and an open position out of sealing engagement with the walls of the valve housing for permitting passage of fluid through the discharge port. The test cock apparatus also includes a test cock communicating with the chamber of the valve housing for monitoring fluid pressure therein.

16 Claims, 7 Drawing Sheets

TEST COCK APPARATUS WITH FREEZE PROTECTION CAPABILITY

TECHNICAL FIELD AND BACKGROUND OF THE INVENTION

This invention relates to a test cock apparatus with freeze protection capability particularly intended not only for monitoring the pressure and flow of fluid through a valve, such as a backflow prevention valve, but also for preventing the fluid traveling therethrough from freezing. The apparatus incorporates a test cock for use in testing pressure and fluid flow with a thermal actuator element like those used in conventional freeze protection elements. Although the invention of the present application may be used in any suitable environment in which the flow of a liquid must be controlled, the invention is preferably intended for use on a backflow preventer.

A backflow preventer is a well known device commonly used to prevent pollutants originating from downstream sources from contaminating potable water supplies. A typical backflow preventer includes two spring-loaded check valves positioned in serial combination within a housing for preventing backflow of a fluid. Thermal actuator elements are likewise well known, and are commonly used in freeze protection elements. A typical freeze protection element is positioned within a housing having inlet and outlet passages through which fluid enters and exits, respectively. The freeze protection element is normally in sealing engagement with a relief port which is defined by the housing for discharging fluid therefrom in response to changes in temperature. Fluid entering the inlet passage and passing through the interior of the housing encounters the thermal actuator element, which in turn contracts in response to decreased fluid temperature. As the temperature approaches freezing, the actuator contracts enough to disengage the freeze protection element from the relief port which allows the near-freezing water to pass through the relief port and out of the housing. As the cold water exits the housing, the corresponding increase in temperature of the water remaining inside causes the thermal actuator to expand and the freeze protection element to close.

The invention of the present application takes advantage of the fundamental principles underlying freeze protection elements to provide a test cock apparatus having unique freeze protection capabilities. The test cock apparatus of the present invention makes use of a thermal actuator element positioned in a bronze housing. The housings of most freeze protection elements include inlet and outlet passages positioned in alignment with each other. In contrast, the housing of the test cock apparatus of the present invention lacks an outlet passage and instead defines an inlet passage which is positioned and extends perpendicularly to a narrow discharge passage. The thermal actuator is positioned within the housing perpendicular to the inlet passage and is in alignment with and upstream from the discharge passage. The thermal actuator includes a thermosensitive element which expands in response to increased ambient air and system fluid temperatures to push a spring-guided plug into sealing engagement with the discharge passage. The thermosensitive element contracts in response to decreased ambient air and system fluid temperatures, thereby causing the plug to disengage the passage for permitting near-freezing fluid to pass through.

The invention of the present application employs inlet and discharge passages which are innovatively positioned relative to each other and to the thermal actuator and test cock. The invention also combines the fluid and pressure monitoring capabilities of a test cock valve with the thermodynamic principles underlying freeze protection elements to provide a unique test cock apparatus for ensuring that adequate fluid temperature, pressure and flow are maintained within a valve housing.

SUMMARY OF THE INVENTION

Therefore, it is an object of the invention to provide a test cock apparatus which is not only capable of monitoring fluid pressure and flow within a valve housing, but also of ensuring that the fluid passing through the valve housing does not freeze.

It is another object of the invention to provide a test cock apparatus having components which are not permanently connected to one another or to an external object, thereby allowing ease of access to and repair of the components.

It is another object of the invention to provide a test cock apparatus with freeze protection capabilities which may be directly attached to another valve, such as a backflow preventer valve, or to another test cock which is in turn attached to the backflow preventer valve.

These and other objects of the present invention are achieved in the preferred embodiments disclosed below by providing a test cock apparatus with freeze protection capability for controlling fluid pressure and flow in a backflow preventer valve. The test cock apparatus includes a valve housing having interior walls defining a chamber therein and including an inlet port and a discharge port communicating with the chamber for permitting fluid flow therethrough. A temperature-responsive freeze protection element is positioned within the chamber and is axially moveable between a closed position in sealing engagement with the interior walls of the valve housing for preventing fluid flow through the discharge port, and an open position out of sealing engagement with the walls of the valve housing for permitting passage of fluid through the discharge port. A test cock communicates with the chamber of the valve housing for monitoring fluid pressure therein.

According to one preferred embodiment of the invention, the inlet port is positioned perpendicular to the discharge port.

According to another preferred embodiment of the invention, the test cock is positioned in axial alignment with the inlet port and perpendicular to the discharge port.

According to yet another preferred embodiment of the invention, the freeze protection element includes a thermal actuator disposed within the valve housing for moving the freeze protection element to the closed position by expanding in response to increasing fluid temperature and to the open position by contracting in response to decreasing fluid temperature.

According to yet another preferred embodiment of the invention, the freeze protection element further includes a spring captured in the chamber of the valve housing for moving the freeze protection element in and out of sealing engagement with the walls of the valve housing in response to a respective increase or decrease in fluid temperature.

According to yet another preferred embodiment of the invention, the freeze protection element further includes a spring guide plug having a first end adapted for receiving the thermal actuator therein and a second end adapted for moving in and out of sealing engagement with the walls of the valve housing in response to the respective increase or decrease in fluid temperature.

According to yet another preferred embodiment of the invention, the spring is concentrically positioned along the length of the spring guide plug, and the first end of the spring guide plug includes a flange for capturing the spring between the first and second ends, thereby permitting the spring to expand and contract in response to the respective contraction and expansion of the thermal actuator for moving the second end of the spring guide plug in and out of sealing engagement with the walls of the valve housing in response to the respective increase or decrease in fluid temperature.

According to yet another preferred embodiment of the invention, the second end includes a beveled portion. An O-ring is captured in an annular groove extending around the second end adjacent to the beveled portion. The walls of the valve housing define a complementary chamfered shoulder for cooperating with the beveled portion and the O-ring for sealingly engaging the second end of the spring guide plug with the walls.

According to yet another preferred embodiment of the invention, a backflow preventer for protecting fluid sources from pollutants is disclosed. The backflow preventer valve housing has inner walls defining an interior and first and second ports which communicate with the interior for permitting fluid flow therethrough. At least one backflow preventer valve assembly is disposed within and communicates with the interior for preventing backflow of fluid therethrough. Furthermore, at least one test cock apparatus with freeze protection capability is removably connected to the backflow preventer valve housing and communicates with the interior for controlling fluid pressure and flow therethrough. The test cock apparatus comprises a valve housing having interior walls defining a chamber therein and including an inlet port and a discharge port communicating with the chamber for permitting fluid flow therethrough. A temperature-responsive freeze protection element is positioned within the chamber and axially moveable between a closed position in sealing engagement with the interior walls of the valve housing for preventing fluid flow through the discharge port and an open position out of sealing engagement with the walls of the valve housing for permitting passage of fluid through the discharge port. The test cock apparatus also includes a test cock communicating with the chamber of the valve housing for monitoring fluid pressure therein.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
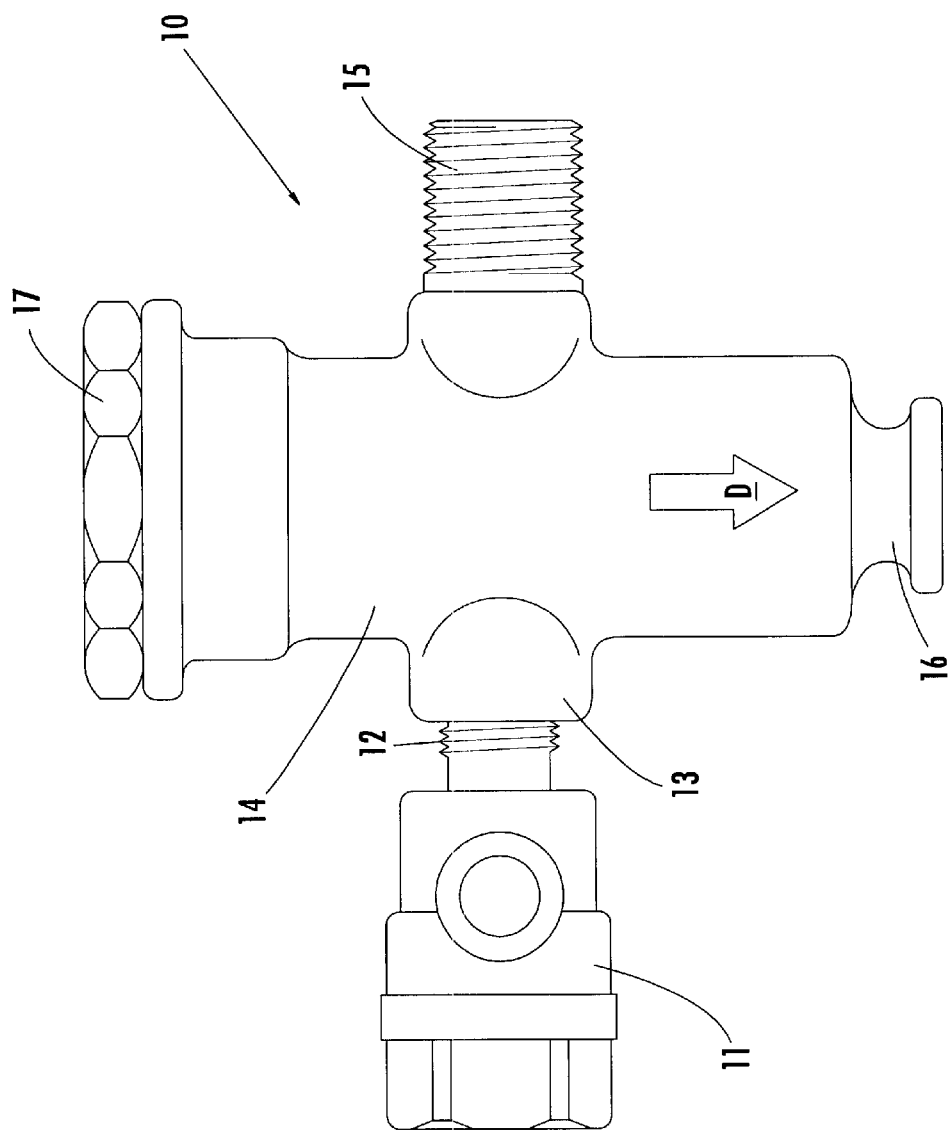
FIG. 1 is a side view of a test cock apparatus according to one embodiment of the invention.

Referring now specifically to the drawings, a test cock apparatus with freeze protection capability is illustrated in FIG. 1 and shown generally at reference numeral 10. The test cock apparatus 10 includes a test cock valve 11, which has a threaded cylindrical end 12. Cylindrical end 12 is received by complementary threaded connecting member 13, which is formed with a valve housing 14. Although the valve housing 14 may be formed from any suitable material, it is preferably formed from bronze. A cylindrical threaded fitting 15 is formed with the valve housing 14 and positioned in axial alignment with the connecting member 13 for connecting the test cock apparatus 10 to a backflow preventer or other suitable valve assembly (not shown) for permitting passage of fluid through the interior of the valve housing 14. A cylindrical discharge outlet 16 is also formed with the valve housing 14 and extends perpendicularly to the fitting 15 for permitting passage of fluid out of the valve housing 14 in the direction "D" shown.

Regulations governing the design, manufacture, installation and maintenance of backflow preventers require that all associated parts be removable for inspection and repair in the field without removing the backflow preventer housing from the waterline. Test cock apparatus 10 thus also includes an internally-threaded cover 17 for permitting ready access to the interior of the housing 14.

Figure 2:
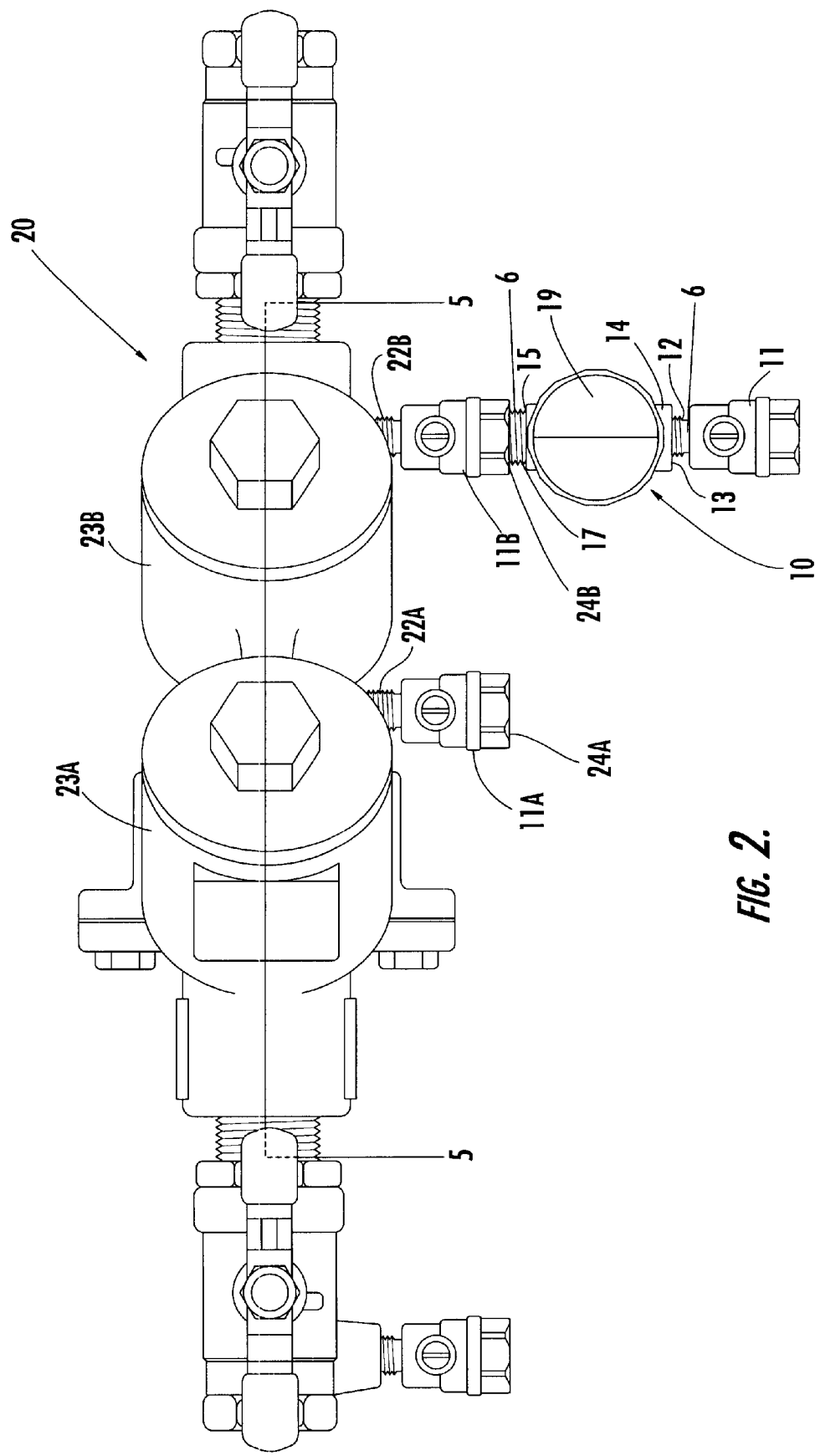
FIG. 2 is a top view of a backflow preventer including a test cock apparatus with freeze protection capability according to one embodiment of the invention showing the test cock apparatus connected to another test cock which is in turn connected to the backflow preventer.
Figure 3:
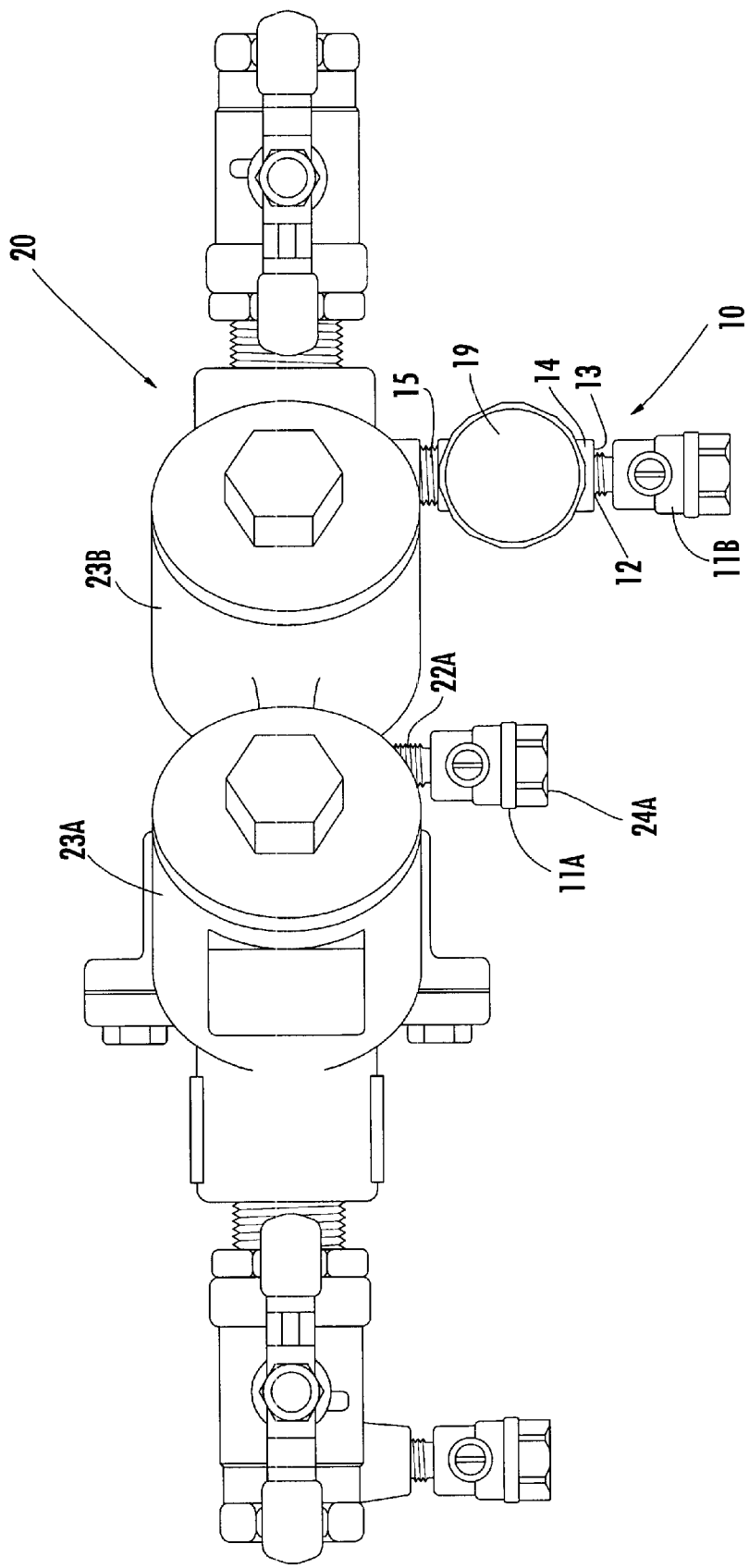
FIG. 3 is a top view of the backflow preventer and showing a test cock apparatus with freeze protection capability connected directly to the backflow preventer.

Referring now to FIG. 2, the test cock apparatus 10 is shown installed on a backflow preventer 20. The backflow preventer 20 includes two identical test cock valves 11A and 11B removably connected to complementary connecting ends 22A and 22B, respectively, which are formed with and positioned downstream from respective identical backflow preventer valve housings 23A and 23B. Test cock valves 11A and 11B include respective tops 24A and 24B, each of which defines a threaded opening (not shown) for receiving the complementary threaded fitting 15 of the housing 14 to connect the test cock apparatus 10 to the backflow preventer 20. Although FIG. 2 shows test cock apparatus 10 connected to test cock valve 11B, the test cock apparatus 10 may alternatively be connected to test cock valve 11A, or directly to either one of the housings 23A or 23B. FIG. 3 shows the backflow preventer 20 with the test cock valve 11B removed and the test cock assembly 10 connected directly by the fitting 15 to the housing 23B.

Figure 4:
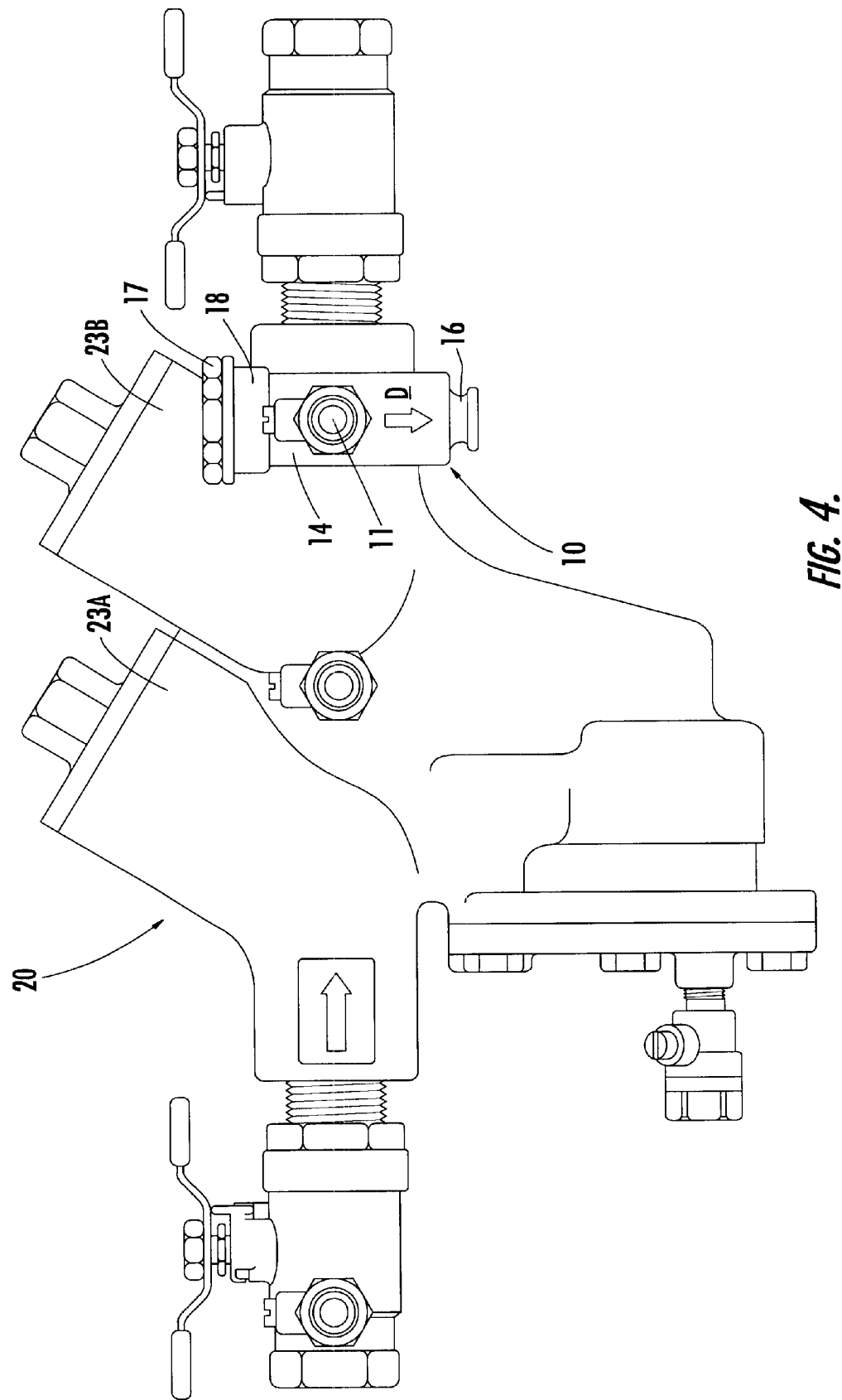
FIG. 4 is a side view of the backflow preventer shown in FIG. 3.

As is shown in FIG. 4, the test cock apparatus 10 is installed on the backflow preventer 20 so that the housing cover 17 is oriented above the discharge outlet 16 to take advantage of the force of gravity on the fluid inside the housing 14 for urging the fluid through the discharge outlet 16 in the direction "D" shown.

Figure 5:
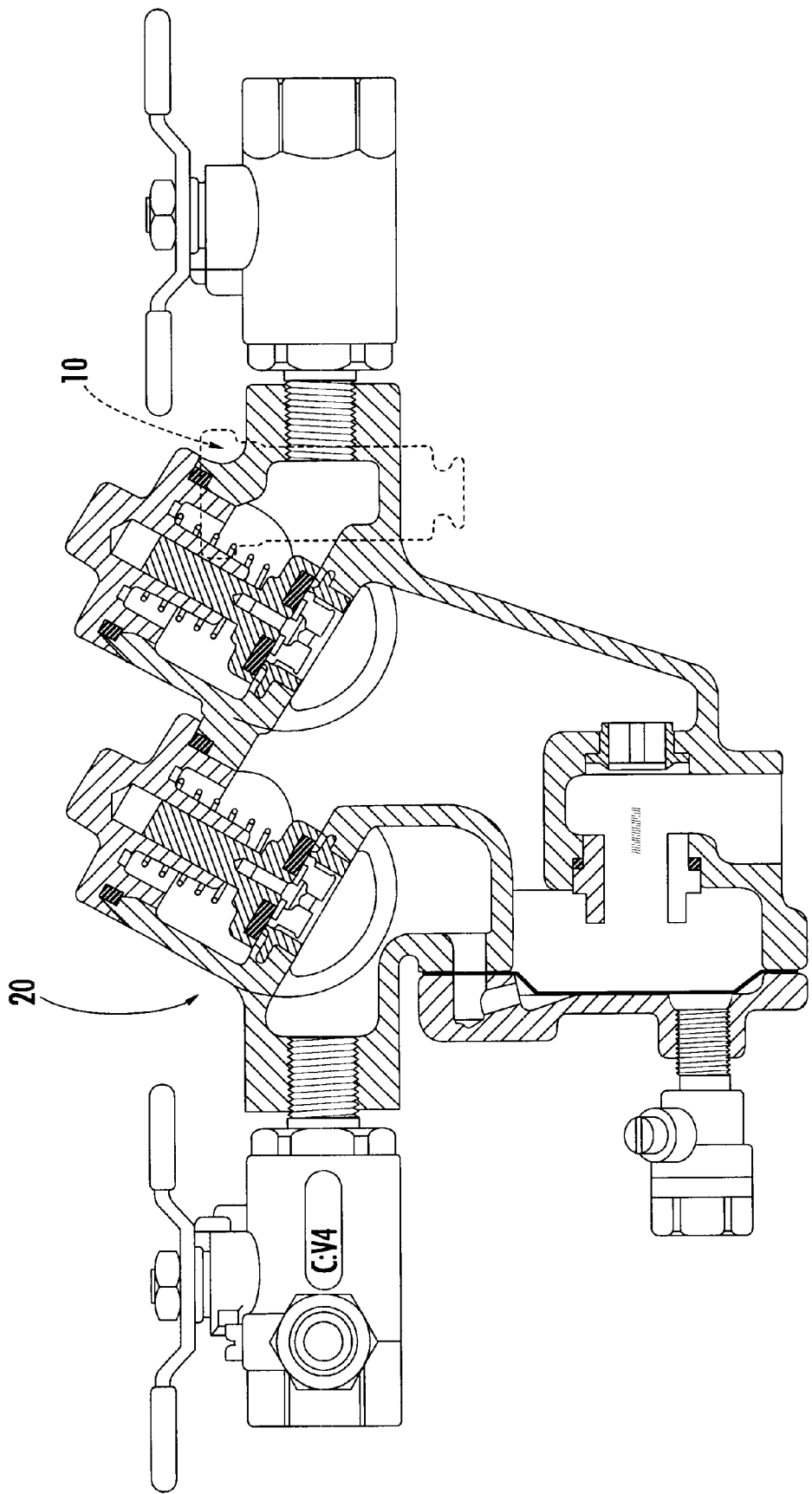
FIG. 5 is a cross-sectional view of the backflow preventer shown in FIG. 2 and taken along Line 5—5 with the test cock apparatus shown in phantom.

FIG. 5 shows the interior of the backflow preventer 20 with the test cock apparatus 10 in phantom to illustrate the position of the test cock apparatus 10 relative to the interior components of the backflow preventer 20.

Figure 6:
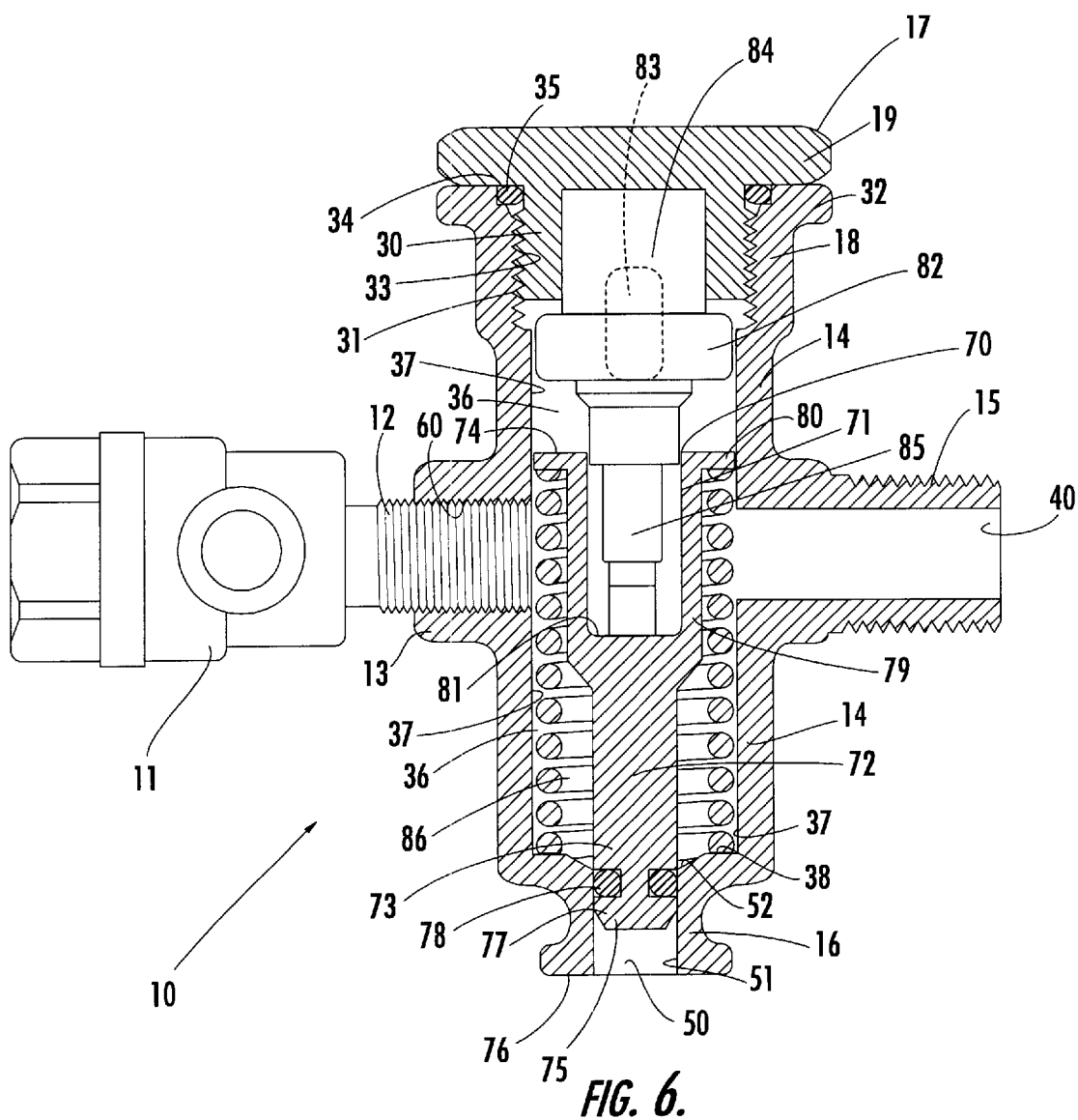
FIG. 6 is a cross-sectional view of the test cock apparatus taken along Line 6—6 of FIG. 2 and showing the freeze protection element in a closed position.

Referring now to FIG. 6, housing cover 17 includes a cap 19 with a threaded outer wall portion 31. The valve housing 14 includes an outwardly extending annular flange 32 formed with a threaded cylindrical inner wall 33 adapted for receiving the threaded outer wall portion 31 of housing cover 17. The flange 32 includes a groove 34 into which an O-ring 35 is received for creating a fluid seal between the cap 19 and the flange 32.

The valve housing 14 also includes an interior chamber 36 defined by a cylindrical interior wall 37. Cylindrical wall 37 is formed with threaded inner wall 33 and an annular shoulder 38 of reduced diameter. An inlet port 40 defined by a fitting 15 is in fluid communication with the interior chamber 36. Interior chamber 36 likewise fluidly communicates with a discharge port 50, which is defined by a cylindrical inner wall 51 formed within the discharge outlet 16. Inner wall 51 is positioned and extends perpendicularly to the fitting 15, and includes a chamfer 52 formed with the shoulder 38. Fluid normally enters the valve housing 14 through the inlet port 40, passes through the interior chamber 36, and exits through the discharge port 50.

FIG. 6 also shows the manner in which the test cock 11 is connected to the valve housing 14. A threaded bore 60 is defined by test cock connecting member 13. The bore 60 is in fluid communication with chamber 36. The bore 60 also receives the threaded cylindrical end 12 of the test cock 11 for connecting the test cock 11 to the housing 14.

As is shown in FIG. 6, a freeze protection element 70 is removably positioned perpendicular to the threaded neck 15 within the interior chamber 36. The valve 70 includes a spring guide plug 71 formed by a stem 72 having first and second ends 73 and 74, respectively. The first end 73 forms a seat 75 having a beveled edge 76. The seat 75 is positioned within the discharge port 50 and includes an annular groove 77 adjacent the beveled edge 76. An O-ring 78 is positioned within the groove 77 for forming a fluid seal between the seal 75 and the inner wall 51. The second end 74 of the stem 72 forms a tubular retaining member 79. The retaining member 79 includes a flange 80 and a chamber 81 into which a thermal actuator 82 is received. The actuator 82 includes a thermosensitive element 83 enclosed within a valve cap 84. The thermosensitive element 83 may be one of a number of known substances that expand in response to increased temperature and contract in response to decreased temperature. The thermosensitive element 83 acts on a piston 85 which extends downwardly from the valve cap 84 and is in abutting engagement with the chamber 81 of the retaining member 79.

The freeze protection element 70 also includes a spring 86 which is positioned along the stem 72 and around the outer circumference of the retaining member 79. The spring 86 is preferably a compression spring, and is captured between the flange 80 and the shoulder 38, and is axially compressible in a direction perpendicular to fluid flow through the inlet port 40 and in a direction in alignment with fluid flow through the discharge port 50.

FIG. 6 shows the test cock apparatus 10 with the freeze protection element 70 in a closed position, indicating that the temperature of the fluid passing through the inlet port 40 and into the chamber 36 is above its freezing point. Under such circumstances, the thermosensitive element 83 is fully expanded, creating a force on the piston 85 which in turn produces a force on the retaining member 79. The force created by the piston 85 translates into a corresponding force of the flange 80 on the spring 86, which not only causes the spring 86 to compress, but also maintains the seat 75 within the discharge port 50 in sealing engagement with the inner wall 51.

The seat 75 will remain positioned in the discharge port 50 as long as the temperature of the fluid passing through the inlet port 40 and across the thermal actuator 82 does not approach its freezing point. However, as the fluid temperature begins to decrease, the thermosensitive element 83 correspondingly compresses. The force of the piston 85 decreases in response to the compression of the thermosensitive element 83, which likewise causes the force of the flange 80 on the spring 86 to decrease. The spring 86 axially expands in response, pushing the flange 80 toward the thermal actuator 82 and pulling the seat 75 out of the discharge port 50. Once the seat 75 is removed, the cold fluid captured within the chamber 36 exits through the discharge port 50. The quantity of fluid allowed to flow out of the discharge port 50 directly depends upon the degree to which the thermosensitive element 83 is compressed.

Figure 7:
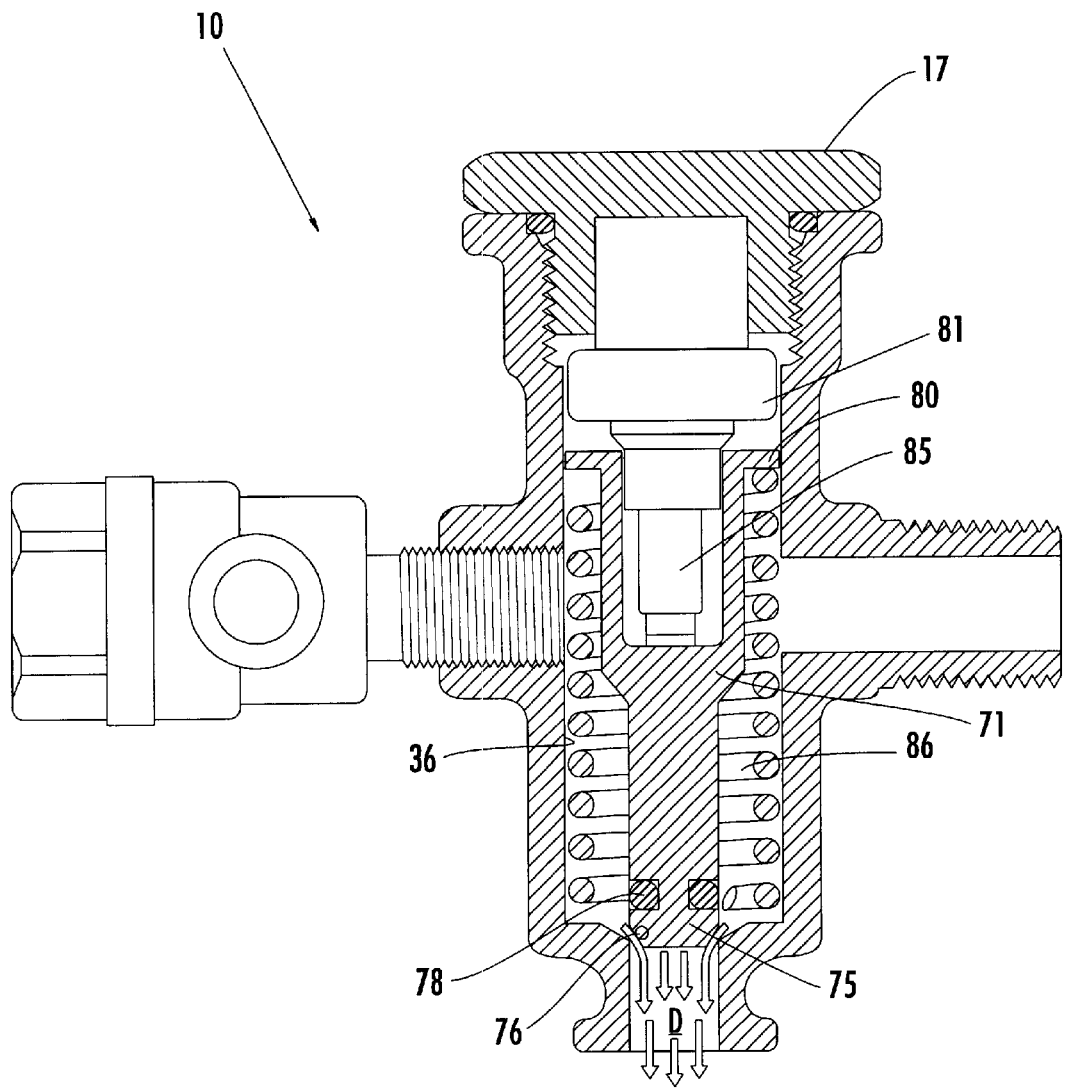
FIG. 7 is a cross-sectional view of the test cock apparatus shown in FIG. 6 with the freeze protection element in an open position.

Referring now to FIG. 7, the test cock apparatus 10 is shown with the seat 75 fully disengaged from the inner wall 51 for allowing cooler fluid to pass through the discharge port 50 in the direction "D" shown. This prevents the fluid from freezing within the housing 14 and the backflow preventer 20. See FIG. 5.

A test cock apparatus with freeze protection capabilities has been disclosed. Various details of the invention may be changed without departing from its scope. Furthermore, the foregoing description of the preferred embodiments of the invention and the best mode for practicing the invention are provided for the purpose of illustration only and not for the purpose of limitation—the invention being defined by the claims.

I claim:

1. A test cock apparatus with freeze protection capability for controlling fluid pressure and flow in a backflow preventer valve, comprising:

(a) a valve housing having interior walls defining a chamber therein and including an inlet port and a discharge port positioned at a right angle to each other and communicating with said chamber for permitting fluid flow therethrough;

(b) a temperature-responsive freeze protection element positioned within the chamber in axial alignment with said discharge port and in flow communication with said inlet port, and axially moveable between a closed position in sealing engagement with said interior walls of the valve housing for preventing fluid flow through the discharge port and an open position out of sealing engagement with the walls of the valve housing for permitting passage of fluid through the discharge port; and (c) a test cock communicating with the chamber of the valve housing adjacent a point of intersection of the longitudinal axis of the inlet port and the longitudinal axis of the discharge port for monitoring fluid pressure within the chamber.

2. A test cock apparatus according to claim 1, wherein said inlet port is positioned perpendicular to the discharge port.

3. A test cock apparatus according to claim 2, wherein said test cock is positioned in axial alignment with the inlet port and perpendicular to the discharge port.

4. A test cock apparatus according to claim 3, wherein said freeze protection element comprises a thermal actuator disposed within the valve housing for moving said freeze protection element to said closed position by expanding in response to increasing fluid temperature and to said open position by contracting in response to decreasing fluid temperature.

5. A test cock apparatus according to claim 4, wherein said freeze protection element further comprises a spring captured in the chamber of the valve housing for moving the freeze protection element in and out of sealing engagement with the walls of the valve housing in response to a respective increase or decrease in fluid temperature.

6. A test cock apparatus according to claim 5, wherein said freeze protection element further comprises a spring guide plug having a first end adapted for receiving said thermal actuator therein and a second end adapted for moving in and out of sealing engagement with the walls of the valve housing in response to the respective increase or decrease in fluid temperature.

7. A test cock apparatus according to claim 6, wherein said spring is concentrically positioned along the length of the spring guide plug, and said first end of the spring guide plug includes a flange for capturing the spring between the first and second ends, thereby permitting the spring to expand and contract in response to the respective contraction and expansion of the thermal actuator for moving the second end of the spring guide plug in and out of sealing engagement with the walls of the valve housing in response to the respective increase or decrease in fluid temperature.

8. A test cock apparatus according to claim 7, wherein said second end includes a beveled portion and an O-ring captured in an annular groove extending around the second end adjacent to said beveled portion, and the walls of the valve housing define a complementary chamfered shoulder for cooperating with said beveled portion and O-ring for sealingly engaging the second end of the spring guide plug with the walls.

9. A backflow preventer for protecting fluid sources from pollutants, comprising:
   (a) a backflow preventer valve housing having inner walls defining an interior and first and second ports communicating with said interior for permitting fluid flow therethrough;
   (b) at least one backflow preventer valve assembly disposed within and communicating with the interior for preventing backflow of fluid therethrough; and
   (c) at least one test cock apparatus with freeze protection capability removably connected to the backflow preventer valve housing and communicating with the interior for controlling fluid pressure and flow therethrough, comprising:
      (i) a valve housing having interior walls defining a chamber therein and including an inlet port and a discharge port positioned at a right angle to each other and communicating with said chamber for permitting fluid flow therethrough;
      (ii) a temperature-responsive freeze protection element positioned within the valve housing in axial alignment with said discharge port and in flow alignment with said inlet port for encountering fluid flow through the chamber, and axially moveable between a closed position in sealing engagement with said interior walls of the valve housing for preventing fluid flow through said discharge port and an open position out of sealing engagement with the walls of the valve housing for permitting passage of fluid through the discharge port; and
      (iii) a test cock communicating with the chamber of the valve housing adjacent a point of intersection of the longitudinal axis of the inlet port and the longitudinal axis of the discharge port for monitoring fluid pressure within the chamber.

10. A backflow preventer according to claim 9, wherein said inlet port of said valve housing is positioned perpendicular to the discharge port.

11. A backflow preventer according to claim 10, wherein said test cock is positioned in axial alignment with the inlet port and perpendicular to the discharge port.

12. A backflow preventer according to claim 11, wherein said freeze protection element comprises a thermal actuator disposed within the valve housing for moving said freeze protection element to said closed position by expanding in response to increasing fluid temperature and to said open position by contracting in response to decreasing fluid temperature.

13. A backflow preventer according to claim 12, wherein said freeze protection element further comprises a spring captured in the chamber of the valve housing for moving the freeze protection element in and out of sealing engagement with the walls of the valve housing in response to a respective increase or decrease in fluid temperature.

14. A backflow preventer valve according to claim 13, wherein said freeze protection element further comprises a spring guide plug having a first end adapted for receiving said thermal actuator therein and a second end adapted for moving in and out of sealing engagement with the wall of the valve housing in response to the respective increase or decrease in fluid temperature.

15. A test cock apparatus according to claim 14, wherein said spring is concentrically positioned along the length of the spring guide plug, and said first end of the spring guide plug includes a flange for capturing the spring between the first and second ends, thereby permitting the spring to expand and contract in response to the respective contraction and expansion of the thermal actuator for moving the second end of the spring guide plug in and out of sealing engagement with the walls of the valve housing in response to the respective increase or decrease in fluid temperature.

16. A backflow preventer according to claim 15, wherein said second end includes a beveled portion and an O-ring captured in an annular groove extending around the second end adjacent to said beveled portion, and the walls of the valve housing define a complementary chamfered shoulder for cooperating with said beveled portion and O-ring for sealingly engaging the second end of the spring guide plug with the walls.

* * * * *